United States Patent Office 2,772,208
Patented Nov. 27, 1956

2,772,208

DEHYDRATING LPG CONTAINING CARBONYL SULFIDE WITH SILICA GEL

Robert J. Ferm, Kansas City, Mo., assignor to Standard Oil Company, Chicago, Ill., a corporation of Indiana No Drawing. Application December 7, 1954,
Serial No. 473,761

4 Claims. (Cl. 196—4)

This invention relates to the dehydration of liquified petroleum gas. More particularly the invention relates to dehydrating LPG which contains appreciable amounts of carbonyl sulfide.

Liquified petroleum gas, i. e., propane, butane and mixtures thereof has attained major status as a fuel for domestic purposes. In order to avoid the clogging of valves and small lines by ice crystals when the atmospheric temperature drops below about 32° F., a rigid moisture content specification is imposed on LPG used for domestic purposes such as cook stoves and furnaces. The liquified petroleum gas is normally dehydrated, i. e., freed of dissolved water as well as occluded water, by passage through a solid adsorbent, such as alumina or bauxite. At present alumina is the commercially preferred dehydrating agent.

Liquid propane, liquid butane and mixtures thereof suitable for use as LPG are now being obtained from the gaseous products of refinery operations. The liquid propane and liquid propane-butane mixtures derived from the gaseous products of thermal and catalytic cracking and coking operations contain appreciable amounts of hydrogen sulfide and carbonyl sulfide. The hydrogen sulfide is readily removed by treatment with aqueous caustic. The carbonyl sulfide is not removed by such treatment. Carbonyl sulfide does not appear to have any adverse effect in the end use of propane and butane for domestic purposes and need not normally be removed from the refinery propane and butane going to LPG use.

In addition to the specification on water content, a rigid copper strip specification is imposed on LPG because the lines carrying the LPG in domestic use are usually made of copper. The specification requires a perfect copper strip. It has been discovered that refinery LPG which has been dehydrated by passage through a bed of alumina has a bad copper strip. The cause of the bad copper strip has been traced to the decomposition of the carbonyl sulfide present in the refinery LPG to elemental sulfur and hydrogen sulfide, i. e., materials that attack copper and produce a bad copper strip. This problem has been overcome in commercial practice by contacting the dehydrated corrosive LPG with flake caustic, preferably flake KOH. Obviously this is an expensive procedure and one that should be eliminated if at all possible.

An object of the invention is the dehydration of liquified petroleum gas which contains water and also carbonyl sulfide. A further object is a process of dehydrating LPG containing carbonyl sulfide to produce a dehydrated LPG that is not corrosive to copper. A further object is a process of dehydrating LPG containing water and carbonyl sulfide without the formation of materials that are corrosive to copper. Other objects will become apparent in the course of the detailed description.

It has been discovered that a solid adsorbent silica gel does not decompose carbonyl sulfide to any appreciable extent under conditions such that water is removed from liquified petroleum gases containing both water and carbonyl sulfide.

The silica gel utilized in the process of this invention is that known to commerce and utilized for adsorptive processes, such as separation of hydrocarbons and also in the removal of water from gasoline.

The term "liquified petroleum gas" as utilized herein applies to liquid propane, liquid butane, a mixture of liquid butanes and butenes, mixtures of propane and butane, mixtures of propane and refinery butanes-butenes and also a mixture of $C_3$ and $C_4$ and some $C_5$ hydrocarbons as obtained in refinery distillative processes from naphthas and adsorptive recovery from refinery gas streams.

The feed to the process of the invention is a liquified petroleum gas which contains more than the minimum amount of water tolerance specified by the NGAA. Also, the feed contains appreciable amounts of carbonyl sulfide; the amount of carbonyl sulfide is more than that amount which would cause a bad copper strip to be obtained on LPG which has been dehydrated by passage through alumina. This amount of carbonyl sulfide is more than about 2 parts per million of carbonyl sulfide calculated as sulfur.

The dehydration of the feed is carried out by contacting the feed with the feed in the liquid state and the necessary amount of silica gel or by flowing the feed through a bed of silica gel. In the continuous process the bed of silica gel is used until it has become substantially saturated and the effluent LPG just barely meets the NGAA specification with respect to water content; the conventional regeneration techniques may be used to regenerate the spent silica gel, for example a bed may be blown with super heated steam until all of the adsorbed water has been removed; the bed is then cooled and feed once again charged to the revivified bed.

The results obtainable by the process of the invention are illustrated by the following working examples and also there is presented the results of dehydration using alumina agent.

The tests were carried out using a fixed bed contactor 3 inches in internal diameter and 12 inches high. The bed contained 2 pounds of commercial grade silica gel screened to pass through a 6 mesh but not through a 16 mesh screen.

Commercial grade alumina particles of 8 mesh size were used in the tests on alumina dehydration.

In the tests, the LPG feed flowed through the bed at a rate of 0.1 gallon per minute and a temperature of 75° F. In each test, the effluent LPG had been dehydrated to a degree sufficient to pass specifications.

The LPG feed and the effluent from the silica gel test and the alumina test were analyzed for sulfur-containing materials. The analysis of the feed LPG and the effluent LPG's are set out in the following table.

| Sulfur Compounds as p. p. m. "S" | Feed | Silica Gel Effluent | Alumina Effluent |
|---|---|---|---|
| Carbonyl Sulfide | 27 | 27 | 1 |
| Mercaptan | 1 | 1 | 2 |
| Hydrogen Sulfide | 0 | 0 | 1 |
| Elemental Sulfur | 0 | 0 | 23 |
| Copper Strip | Perfect | Perfect | Black |

The tests show that alumina does decompose the carbonyl sulfide to materials which corrode copper metal and prevent its use as LPG without further treatment. On the other hand, silica gel, which does an equally satisfactory job of dehydration, did not in any way affect the type of sulfur compounds present and the silica gel dehydrated material was entirely satisfactory for use as LPG without any further treatment.

Thus having described the invention what is claimed is:

1. A dehydration process which comprises contacting liquified petroleum gas which contains appreciable amounts of carbonyl sulfide and objectionable amounts of dissolved water with a dehydrating agent consisting of silica gel and separating from said silica gel a substantially dehydrated liquified petroleum gas of unchanged carbonyl sulfide content.

2. The process of claim 1 wherein said liquified petroleum gas is propane.

3. The process of claim 1 wherein said liquified petroleum gas is a mixture of propane and butane.

4. A process for preparing specification LPG which consists in passing through a bed consisting of silica gel a liquified petroleum gas prepared from petroleum refinery operations, which liquified petroleum gas contains objectionable amounts of dissolved water and appreciable amounts of carbonyl sulfide and withdrawing from said bed of silica gel a dehydrated LPG which is not corrosive as determined by the copper strip test.

References Cited in the file of this patent
UNITED STATES PATENTS

| | | |
|---|---|---|
| 2,309,871 | Schulze et al. | Feb. 2, 1943 |
| 2,356,890 | Schulze | Aug. 29, 1944 |
| 2,594,311 | Johnson et al. | Apr. 29, 1952 |
| 2,690,989 | Bottenburg | Oct. 5, 1954 |
| 2,692,656 | Berg | Oct. 26, 1954 |